United States Patent
Duraisamy et al.

(10) Patent No.: US 11,983,197 B2
(45) Date of Patent: May 14, 2024

(54) DECLARATIVE METHOD OF GROUPING, MIGRATING AND EXECUTING UNITS OF WORK FOR AUTONOMOUS HIERARCHICAL DATABASE SYSTEMS

(71) Applicant: Oracle International Corporation, Redwood Shores, CA (US)

(72) Inventors: Rajagopalan Duraisamy, Bengaluru (IN); Ravi Shankar Thammaiah, Redwood Shores, CA (US); Nagarajan Muthukrishnan, Foster City, CA (US); Sajithkumar Santhamma Sasikumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 47 days.

(21) Appl. No.: 17/699,740

(22) Filed: Mar. 21, 2022

(65) Prior Publication Data
US 2023/0297593 A1    Sep. 21, 2023

(51) Int. Cl.
  *G06F 16/28*    (2019.01)
  *G06F 16/21*    (2019.01)
(52) U.S. Cl.
  CPC ............ *G06F 16/282* (2019.01); *G06F 16/21* (2019.01)
(58) Field of Classification Search
  CPC ............................ G06F 16/282; G06F 16/21
  See application file for complete search history.

(56) References Cited

U.S. PATENT DOCUMENTS

| 7,406,515 B1 | 7/2008 | Joyce |
| 7,526,634 B1 * | 4/2009 | Duluk, Jr. ............... G06F 9/546 |
| | | 712/216 |

(Continued)

OTHER PUBLICATIONS

Zisman et al., "An approach to interoperation between autonomous database systems", Distrib. Syst. Engng 6 (1999) 135-148. Printed in the UK, 15 pages.

(Continued)

*Primary Examiner* — Hares Jami
(74) *Attorney, Agent, or Firm* — Hickman Becker Bingham Ledesma LLP; Brian Miller

(57) ABSTRACT

Herein is database administration workflow automation with source annotations and intelligent scheduling techniques for applying a hierarchy of interdependent administrative tasks to distributed and/or nested databases. In an embodiment, a source language compiler analyzes annotations to identify a hierarchy of administrative tasks that administers pluggable databases in container databases. From the annotations, a runtime codebase is generated that implements and invokes the administrative task hierarchy. At runtime, a container database management system (CDBMS) autonomously identifies and instantiates the administrative tasks, including identifying a dependency of a first administrative task on a second administrative task and a lack of dependency of a third administrative task on the second administrative task. The CDBMS contains an intelligent scheduler that concurrently executes the second and third administrative tasks and defers execution of the first administrative task until after completion of the second administrative task. For example, the administrative tasks may be distributed to different databases for parallelism or instead sequenced for phased execution based on dependencies between administrative tasks or phases.

25 Claims, 5 Drawing Sheets

(56) References Cited

U.S. PATENT DOCUMENTS

| | | | | |
|---|---|---|---|---|
| 8,769,491 | B1* | 7/2014 | Conti | G06F 8/314 |
| | | | | 709/201 |
| 8,874,457 | B2* | 10/2014 | Biran | G06Q 10/0637 |
| | | | | 718/1 |
| 10,348,565 | B2 | 7/2019 | Kannan et al. | |
| 10,521,747 | B2 | 12/2019 | Warner | |
| 2002/0138679 | A1* | 9/2002 | Koning | G06F 9/4881 |
| | | | | 710/244 |
| 2003/0154236 | A1 | 8/2003 | Dar | |
| 2005/0038831 | A1 | 2/2005 | Souder | |
| 2005/0198102 | A1 | 9/2005 | Hahn et al. | |
| 2008/0016123 | A1 | 1/2008 | Devraj et al. | |
| 2011/0126197 | A1 | 5/2011 | Larsen | |
| 2012/0151496 | A1* | 6/2012 | Tebbs | G06F 9/4843 |
| | | | | 718/106 |
| 2012/0173717 | A1 | 7/2012 | Kohli | |
| 2013/0047135 | A1* | 2/2013 | Joshi | G06F 8/30 |
| | | | | 717/120 |
| 2015/0089274 | A1* | 3/2015 | Mares | H04L 51/224 |
| | | | | 714/4.11 |
| 2015/0254240 | A1 | 9/2015 | Li | |
| 2016/0094406 | A1 | 3/2016 | Phan | |
| 2017/0116235 | A1* | 4/2017 | Yam | G06F 16/258 |
| 2017/0373940 | A1 | 12/2017 | Shahab et al. | |
| 2018/0096252 | A1 | 4/2018 | Fagundes | |
| 2018/0137139 | A1 | 5/2018 | Bangalore | |
| 2018/0203744 | A1 | 7/2018 | Weismaier | |
| 2019/0102384 | A1* | 4/2019 | Hung | G06F 9/5072 |
| 2019/0102411 | A1 | 4/2019 | Hung et al. | |
| 2020/0067789 | A1 | 2/2020 | Khuti | |

OTHER PUBLICATIONS

Yu et al., "Intelligent Database Placement in Cloud Environment," 2012 IEEE 19th International Conference on Web Services, 2012, pp. 544-551.

Maenhaut et al., "Design and Evaluation of a Hierarchical Multi-Tenant Data Management Framework for Cloud Applications", dated 2015, 6 pages.

Gey et al., "Evolving Multi-tenant SaaS Applications through Self-Adaptive Upgrade Enactment and Tenant Mediation", SEAMS'16 May 16-17, 2016, Austin, TX, USA 2016 AC,7 pages.

Das et al., "Scalable and Elastic Transactional Data Stores for Cloud Computing Platforms", dated Dec. 2011, 302 pages.

Das et al., "Automated Demand-Driven Resource Scaling in Relational Database-as-aService", SIGMOD'16, Jun. 26-Jul. 1, 2016, San Francisco, CA, USA, 12 pages.

Agrawal et al., "Database Scalability, Elasticity, and Autonomy in the Cloud", dated 2011, 14 pages.

* cited by examiner

DECLARATIVE METHOD OF GROUPING, MIGRATING AND EXECUTING UNITS OF WORK FOR AUTONOMOUS HIERARCHICAL DATABASE SYSTEMS

FIELD OF THE DISCLOSURE

This disclosure relates to database administration workflow automation. Presented herein are source annotations and intelligent scheduling techniques for applying a hierarchy of interdependent administrative tasks to distributed and/or nested databases.

BACKGROUND

Organizations are becoming data-driven through modernization of data management deployments. This strategy includes challenges, such as management of large and growing volumes of data. Data is created at an explosive rate such as with internet of things (IoT) data sources. Physical data warehouses are good for collecting data from across the enterprise for analysis, but the storage and compute resources needed to support them are unable to keep pace with growing demand. Cumbersome manual administrative tasks in database lifecycle management pose risks to data due to human errors. To reduce risks, costs, complexity, and time to value, many organizations are taking their data warehouses to the cloud, which offers simpler management, higher scalability and availability with ensured performance, and new ways to cut the costs associated with data storage and processing.

Organizations are proving the value of data warehouses in the cloud with "sandbox" environments, line-of-business data marts, and database backups. More advanced monetization use cases include high-performance data management projects, data warehouses coupled with cloud computing analytics, and big data cloud implementation.

Production operations staff typically includes database administrators (DBAs) and other system administrators to perform database lifecycle management and administrative tasks. Hosting relationships between databases and computers may be more or less rigidly arranged into a network topology, such that software upgrades, horizontal scaling, and planned or emergency provisioning/configuration may be tedious and error prone, especially at cloud scale that is order(s) of magnitude larger than a simple computer cluster.

A database application may span multiple databases of different respective schemas. Each database may be elastically replicated or moved from one computer, virtual machine, or container database to another. A database administration goal such as storage space reclamation may entail several independent or interdependent activities having different respective algorithms or scripts. It may be difficult to create or combine activities in a reusable and portable way. Existing tools and specification frameworks may not be well suited for complex administration activities for complicated database cluster topologies.

Administering parties may include independent and uncoordinated DBAs of multiple enterprises whose databases are incidentally collocated in multitenant databases, cloud provider and datacenter administrators, and autonomous database managements systems (DBMSs) that may spontaneously adjust to optimize for fluctuating resources demand and applications mix. In this environment, a balanced workload is a moving target. Inefficient execution of actions can result in conservative scheduling of actions in a serial manner that sacrifices throughput. Likewise, externally-influenced long running actions can block execution units, which may cause administrative task starvation, decreased throughput, and priority inversion as discussed later herein.

DETAILED DESCRIPTION

Figure 1:
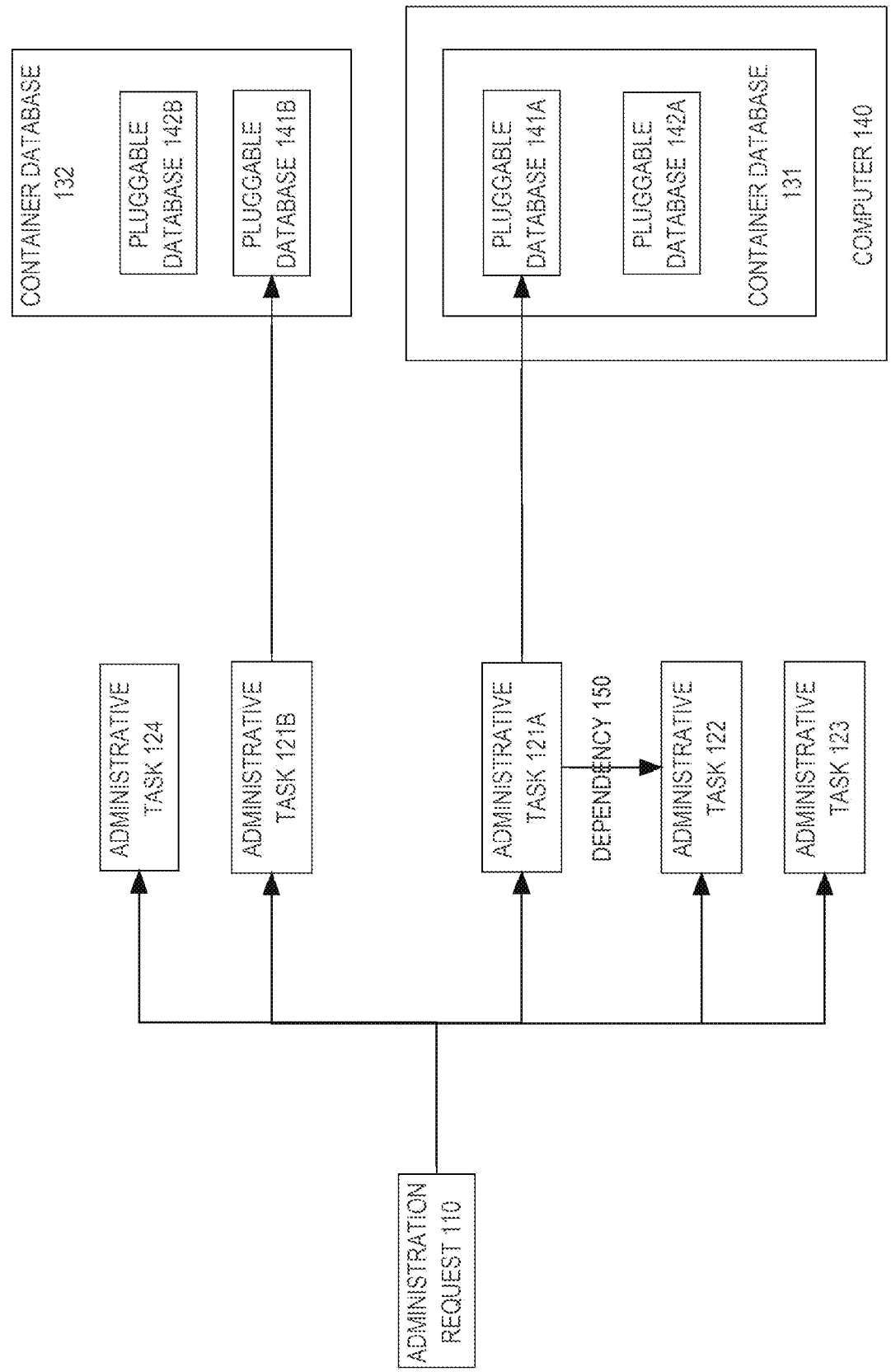
FIG. 1 is a block diagram that depicts an example container database management system (CDBMS) that has database administration workflow automation with intelligent scheduling to apply a hierarchy of interdependent administrative tasks to distributed and/or nested databases.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is database administration workflow automation with declarative ways of grouping, migrating, and executing units of work for autonomous hierarchical database systems. This approach provides source annotations and intelligent scheduling techniques for applying a hierarchy of interdependent administrative tasks to distributed and/or nested databases. A framework provides a way to define and group hierarchical execution behavior and manage runtime state for these units of work. The framework scales and rebalances the units of work based on fluctuating runtime characteristics of the system. The framework intelligently detects independent subunits of work within a given hierarchy and concurrently executes them.

In an autonomous cloud environment, hundreds or thousands of databases can be consolidated together as pluggable databases in isolated consolidated databases. As part of pluggable database management, a consolidated database engine may need to execute many actions within a given pluggable database hierarchy. The execution behavior for these actions can be periodic or on-demand based on external influences.

Automated database administrative tasks can be intensive with respect to computer resources such as a central processing unit (CPU), memory, network bandwidth, and persistent storage. Given that there may be thousands of databases and tens of thousands of administrative tasks having a requirement to execute in a non-interfering and hierarchical manner, efficiently scheduling them across very few execution units in terms of worker threads or processor cores is a cumbersome activity. Shared state among related hierarchical administrative tasks can lead to administrative tasks becoming pinned to execution units such as threads or processor cores, which may prevent rebalancing of administrative tasks at runtime. Imbalance can lead to inefficient executions, skewed long running pipelines of administrative tasks that cause bottlenecks and, as a worst case, deadlocking among execution units. All of these problems are avoidable with automation herein.

With this framework, pluggable databases are automatically administered by hierarchical administrative tasks in a periodic or on-demand manner. With its own multi-threaded scheduler, the framework internally manages processor cores in terms of worker threads. Management logic monitors and efficiently schedules administrative tasks across the threads while maintaining the hierarchy, state, and resource allocations of the administrative tasks.

The framework measures the resource usage of hierarchical group of administrative tasks across threads and hardware to detect trends and patterns of resource usage and, responsively, may intelligently rebalance a workload by reassigning hierarchical administrative tasks to different threads for accelerated execution while maintaining the hierarchy and needed isolation. Some administrative tasks may be rate limited or blocked for various reasons, which requires efficient detection of long running administrative tasks to cause rebalancing. Defining the runtime state for a group of hierarchical administrative tasks can lead to administrative tasks sticking to execution units. The framework provides an automatic way to manage the state for a group of hierarchical administrative tasks so that the state is detached from the execution units and accessed seamlessly by related administrative tasks across execution units.

An administrative task may be fine-grained and defined by a script, a subroutine, a lexical block of logic such as a closure, or any-sized logic that is identified by a handle. Administrative tasks can be defined using compile-time tools or a new language syntax that can be interpreted by a custom compiler. In source logic, an administrative task hierarchy may be specified by annotations such as in a service declaration or definition. The state for a group of administrative tasks may be provided as variables having dynamically allocated shared memory. State variables are accessible from all the execution units upon which the administrative task group runs. State variables can be defined using annotations or other source language primitives.

Administrative tasks performance characteristics may fluctuate with the current state of the system and can be somewhat nondeterministic. For example, an administrative task may stall or perform input/output (I/O) that can directly block the administrative task's thread and indirectly block other administrative tasks that share the thread. A scheduling engine tracks all executions and intelligently rebalances impacted administrative tasks among other threads to preserve system throughput. A rebalancing algorithm is aware of a hierarchy of interdependent administrative tasks that facilitates rescheduling of a whole or partial administrative task hierarchy instead of rescheduling individual administrative tasks. A whole or partial administrative task hierarchy may have its own state variables in addition to variables of individual administrative tasks.

In an embodiment, a source language compiler analyzes annotations to identify a hierarchy of administrative tasks that administers pluggable databases in container databases. From the annotations, a runtime codebase is generated that implements and invokes the administrative task hierarchy.

When the invocation is requested at runtime, a container database management system (CDBMS) autonomously identifies and instantiates the administrative tasks, including identifying a dependency of a first administrative task on a second administrative task and a lack of dependency of a third administrative task on the second administrative task. The CDBMS contains an intelligent scheduler that concurrently executes the second and third administrative tasks and defers execution of the first administrative task until after completion of the second administrative task. For example, the administrative tasks may be distributed to different databases for parallelism or instead sequenced for phased execution based on dependencies between administrative tasks or phases.

1.0 Example Container Database Management System

FIG. 1 is a block diagram that depicts example container database management system (CDBMS) 100 that has database administration workflow automation with intelligent scheduling to apply a hierarchy of interdependent administrative tasks 121A-B and 122-124 to distributed and/or nested databases 131-132, 141A-B, and 142A-B.

Container databases 131-132 may be hosted on a same or separate computers. For example as shown, computer 140 hosts container database 131 but not container database 132. In an embodiment, container databases 131-132 are separate instances of a same multi-instance container database, in which case container databases 131-132 may at different times contain same or different metadata and same or different pluggable databases. In an embodiment, container databases 131-132 may contain respective instances of a same pluggable database such as for horizontal scaling or failover. For example, pluggable databases 141A-141B may be replicas or shards of a same multi-instance pluggable database.

1.1 Database Administration Automation

Lifecycle maintenance of one, some, or all of databases 131-132, 141A-B, and 142A-B may entail automated administration such as patching or installing of logic or content, extraction transformation and/or loading (ETL), report generation, security or regulatory auditing, indexing, horizontal or vertical scaling such as elastic, load balancing, and/or resource reclamation such as compaction. Any such administration may be specified in administration request 110 that CDBMS 100 generates or receives as ad hoc, periodically, or as autonomously initiated by CDBMS 100.

Administration request 110 may expressly specify one or more administrative tasks, which are units of automated work that may respectively administer a same or different databases of a same or different kinds. For example, administration request 110 may be a script, program, or message that applies administrative tasks 122-123 to container database 131 and administrative task 121B to pluggable database 141B. Administration request 110 may specify a repeated administrative task that is implemented as multiple identical administrative tasks applied to different respective databases of a same or different kind. For example, administrative tasks 121A-121B may be identical administrative tasks respectively applied to pluggable databases 141A-141B.

1.2 Interdependent Administrative Tasks

In an embodiment and as discussed later herein, administration request 110 may be constructed from one or more declarations in source logic or in packaged metadata such as a deployment descriptor or property file. For example, a declaration may be a declarative annotation that specifies properties of a (e.g. repeated) administrative task and/or a dependency between administrative tasks. Compilation and instrumentation with annotations that are directly embedded in algorithmic (e.g. imperative) source logic provides a novel way to specify administration request 110 as a hierarchy of interdependent administrative tasks as discussed later herein.

Administration request 110 may specify a repeated administrative task that is implemented as multiple identical administrative tasks respectively applied to all pluggable databases of different kinds in a same container database, such as pluggable databases 141A and 142A in container database 131. That is, administration request 110 may specify, for a repeated administrative task, a scope that specifies: a) one or more container databases, b) no pluggable databases or one or more kinds of pluggable databases or all pluggable databases, and/or c) a multi-instance pluggable database in many container databases. The scope may include a filter that can match one or more databases. For example, the filter may depend on: a) the identity of a computer or a database, b) the version of database software or database content, and/or c) database content values. For example, the filter may be implemented as a regular expression or a database query.

1.3 Concurrency

A repeated administrative task may be implemented as multiple identical administrative tasks that are applied in parallel or in sequence to one or multiple container databases or computers. For example, a repeated administrative task may be concurrently applied for container databases 131-132 but sequentially applied to multiple pluggable databases within a container database. For example, a container database may be associated with a respective synchronization barrier that detects when all concurrent identical administrative task instances of a repeated administrative task finish for that container database. For example, CDBMS 100 may detect that, for a repeated administrative task, container database 131 is finished and container database 132 is not finished. As discussed later herein, CDBMS 100 may track the execution state or status of an individual administrative task or a related subset of administrative tasks.

Administration request 110 may specify multiple independent administrative tasks that may concurrently execute. For example, administrative tasks 122-124 may perform different respective work and may be accelerated by concurrently executing. Administration request 110 may specify a sequencing dependency that indicates that one or more administrative tasks should finish before one or more subsequent administrative tasks start. For example, dependency 150 specifies that administrative task 121A should finish before administrative task 122 starts. For example, administrative task 121A may generate data that administrative task 122 consumes or adjusts. Alternatively as explained later herein, execution of administrative task 122 may be conditioned on administrative task 121A succeeding or failing. For example, administrative tasks 121A and 122 may be distinct ways of reclaiming storage space. If administrative task 121A reclaims sufficient storage space, then administrative task 122 may be unneeded and should not execute.

1.4 Coordinating Multiple Administrative Tasks

As discussed later herein, administrative task execution may be deferred, scheduled, queued, and assigned to an execution mechanism such as a central processing unit (CPU), one of many cores of a CPU, an operating system process, or a lightweight thread. For example, two user-mode threads may be assigned cores or time slices by a scheduler that is internal to CDBMS 100 and is not the native operating system scheduler. The two threads may directly share volatile data by sharing an address space and concurrently execute respective administrative tasks 122-123.

Logic of administrative tasks 122-123 are not necessarily executed by execution units that are in computer 140. For example, administrative task 122 may use a remoting facility such as open database connectivity (ODBC), remote procedure call (RPC), or remote shell (rsh) to operate container database 131 over a communication network. For example, container databases 131-132 may reside in a same or separate datacenters.

As discussed later herein, administration request 110 may expressly specify an administrative task that implicitly creates other administrative task(s). For example, administrative task 122 may execute logic that conditionally or unconditionally specifies and generates administrative task 123. Likewise, CDBMS 100 may have logic that analyzes administration request 110 or administrative task 122 or a subset of administrative tasks, which causes CDBMS 100 to autonomously specify and generate administrative task 123 or another set of administrative tasks. Implicit administrative task creation may entail creation of a dependency between administrative tasks. For example if administrative task 123 is implicitly generated for express administrative task 122, than administrative tasks 122-123 may concurrently or sequentially execute.

1.5 Sequence of Execution Phases

In an embodiment, subsets of administrative tasks are respectively assigned to mutually exclusive sequential execution phases. For example, administration request 110 may specify which administrative tasks execute in which phases. In an embodiment, one subset of administrative tasks may have a dependency on another subset of administrative tasks.

For example, all of the administrative tasks in one phase may be organized into one or more subsets. Thus, the administrative task subset of a next phase may have a dependency on the administrative task subset of the previous phase, and that dependency operates as a synchronization barrier between both phases. In an embodiment that lacks a dependency between administrative task subsets, a barrier between adjacent phases may be implemented with each administrative task in the next phase having individual dependencies respectively on all administrative tasks in the previous phase.

In any case, for administration request 110, only one phase executes at a time, and parallelism occurs only within a phase. For example, performing the next phase may be conditional based on results of the previous phase. Any administrative task in any phase may decide that: a) no subsequent phases should occur orb) an adjacent subsequent phase should be skipped but other subsequent phases should occur. In an embodiment, some administrative task(s) in a next phase are neither specified nor generated in administration request 110, but are instead conditionally generated by a previous administrative task in a previous phase, such as if the previous administrative task did not reclaim enough storage space.

1.6 Racing Ahead

In an example not shown, pluggable databases 141A-141B are instances of a same multi-instance pluggable database for which administration request 110 specifies a sequence of two repeated administrative tasks T1-T2 that may be implemented with two dependencies. For example, two identical instances T2A and T2B of repeatable administrative task T2 may have respective dependencies DA and DB on two identical instances T1A and T1B of repeatable administrative task T1. That is, administrative task T2B depends on administrative task T1B according to dependency DB.

Because administrative tasks T1A and T1B do not depend on each other, they may concurrently execute on separate databases. However, administrative task T1A may be faster and finish before administrative task T1B. For example, pluggable database 141A may have much less content then pluggable database 142B, or pluggable database 141A may be hosted on a faster computer (e.g. more CPU cores or more volatile memory or less unrelated workload) than pluggable database 141B is hosted on.

Thus, after initially concurrently executing administrative tasks T1A and T1B, administrative task T1A finishes and administrative task T1B continues executing. Administrative task T2B depends on ongoing administrative task T1B and thus cannot yet execute. However, administrative task T2A depends on finished administrative task T1A. Thus, administrative tasks T1B and T2A may concurrently execute. In that way, repeatable administrative tasks T1-T2 that should not concurrently execute on a same database may nonetheless concurrently execute on separate respective databases. In other words, work may race ahead on a database or computer, which provides acceleration and may be prevented by adding additional dependency(s). For example, an administrative task on one database or computer may have a dependency on an administrative task on a different database or computer.

1.7 Scheduling

CDBMS 100 may concurrently execute administrative tasks of different administration requests. An administrative task may expressly have a scheduling priority, and an administration request may specify a default administrative task priority. For example, a backlog of pending administrative tasks may await execution in a priority queue and/or a scheduler may preempt a low priority administrative task. Each thread, core, CPU, pluggable database, container database, and/or computer may have its own respective queue. If instead a queue is shared by, for example, many threads or computers, then the queue should be synchronized for thread safety. Scheduling, backlog, and load balancing are discussed later herein.

2.0 Example Administrative Task Scheduling Process

Figure 2:
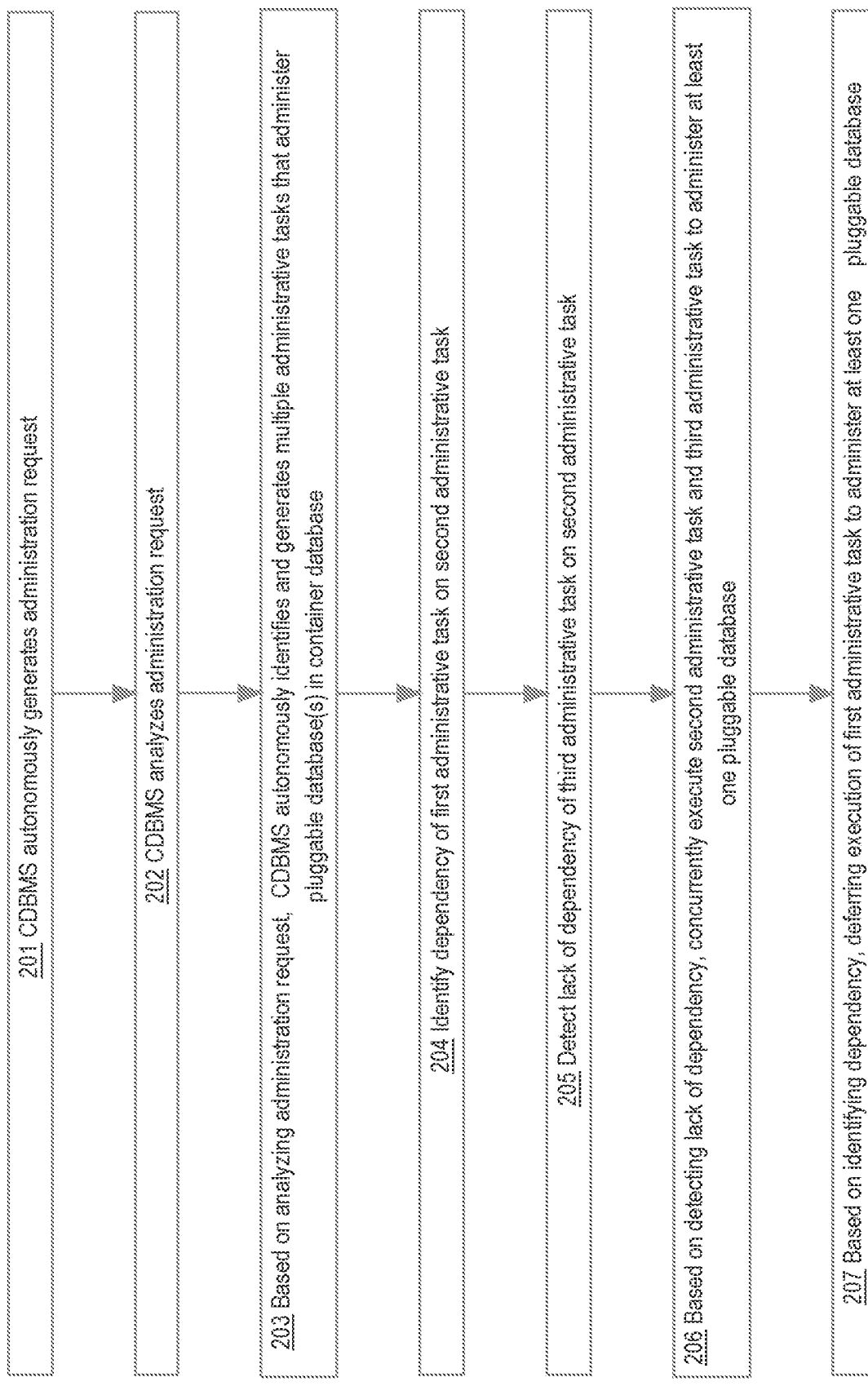
FIG. 2 is a flow diagram that depicts an example computer process that intelligently schedules a hierarchy of interdependent administrative tasks to distributed and/or nested databases.

FIG. 2 is a flow diagram that depicts an example computer process for CDBMS 100 to execute database administration workflow with intelligent scheduling to apply a hierarchy of interdependent administrative tasks 121A-B and 122-124 to distributed and/or nested databases 131-132, 141A-B, and 142A-B. For example, CDBMS 100 may contain controller computer(s) that perform the process of FIG. 2. FIG. 2 is discussed with reference to FIG. 1.

For demonstration, the process of FIG. 2 performs a particular scenario based on flexible techniques that, without limitation, are intended to handle additional automated database administration scenarios. That is, CDBMS 100 has logic that can apply techniques herein to a wide variety of administration requests, hierarchies of interdependent administrative tasks, and mixes of databases and computers. For example in step 201, CDBMS 100 autonomously generates administration request 110 that may instead be generated manually or by a remote system.

For example, CDBMS 100 may monitor fluctuating conditions such as workload and available computer resources and, based on thresholds and/or rules, autonomously decide to self adjust (i.e. reconfigure). Autonomous administration may generate and configure administration request 110 to create or discard an index, reclaim storage space such as by compaction, scale horizontally (e.g. create replicas of a database) or vertically (e.g. allocate more CPU cores to a virtual machine or database or move a database from one computer or container database to another), or gather content statistics such as cardinality. For example, CDBMS 100 may be hosted in an elastic cloud and may adjust to accommodate a spike or new high water mark of demand or a periodic shift from day to night or from workday to weekend.

For example, a planned adjustment such as a schema update to one database may lastingly shift resource consumption enough to necessitate unplanned autonomous changes in other unrelated databases such as due to incidental colocation in a same computer or container database. At a high level of generality, administration request 110 specifies administrative task(s) for any such administration. Administration request 110 might only specify a resource allocation for a database, and CDBMS 100 may generate and configure administrative task(s) to achieve the allocation. For example, administration request 110, with or without actually specifying administrative tasks, may specify that one or both of pluggable databases 141A-141B should have at least a gigabyte of unused disk space, which may be achieved by various mutually exclusive or cooperating administrative tasks as discussed later herein.

Also later herein are novel syntactic specification and compilation techniques for constructing and instrumenting administration request 110 as a hierarchy of interdependent administrative tasks. For example, administration request 110 may be constructed from one or more declarations in source logic or in packaged metadata such as a deployment descriptor or property file. A declaration may be a declarative annotation that specifies properties of a (e.g. repeated) administrative task and/or a dependency between administrative tasks. Compilation and instrumentation with annotations that are directly embedded in algorithmic (e.g. imperative) source logic are discussed later herein.

In step 202, CDBMS 100 analyzes administration request 110. Because administration request 110 might contain only a high level specification, such as horizontally scaling by achieving a minimum count of replicas of a pluggable database for acceleration or reliability, step 202 may decide what work should occur. For example, administration request 110 may specify a minimum of at least ten replicas, but how many new replicas should be created may depend on how many replicas already exist. Likewise, step 202 may decide which container databases should host the new replicas. In other words, administration request 110 may expressly specify some work, but some additional work may be implied such as discovering dynamic conditions such as a least busy container database. Step 202 decides what additional work is implied if any.

Based on step 202's analysis of administration request 110, CDBMS 100 autonomously identifies and generates, in step 203, multiple administrative tasks that administer pluggable database(s) in container database(s). In other scenarios, all involved administrative tasks are expressly specified in administration request 110, and step 203 need only instantiate those specified administrative tasks. As discussed earlier herein, administration request 110 may underspecify/overgeneralize administrative task(s) such as one repeated administrative task that implicitly should be implemented as multiple identical administrative tasks over a set of respective databases.

For example, how many identical administrative tasks does step 203 spawn to implement one repeated administrative task may depend on how many pluggable databases does a container database contain and/or how many databases match a filter. Step 203 may generate, for a same repeated administrative task, different counts of identical administrative tasks for different respective container databases that contain different respective counts of pluggable databases.

Step 203 may spawn implied preparatory administrative task(s) to inspect/interrogate many databases to discover what subset of those databases satisfy the filter. Step 203 may generate and configure a hierarchy of administrative tasks, dependencies between those administrative tasks, administrative task execution phases, and/or administrative task priorities, some or all of which may be expressly specified in administration request 110.

Step 203 configures each administrative task for a particular respective database instance on a particular respective computer. However, step 203 neither schedules nor establishes an ordering or interleaving of administrative tasks. Such workload management is instead performed by steps 204-206 that, in this particular example scenario, occur as follows.

Step 204 identifies a dependency of a first administrative task on a second administrative task. For example, administrative task 122 depends on administrative task 121A according to dependency 150 that step 203 created. Step 204 may detect and enforce implications of dependency 150. For example, step 204 may enqueue administrative task 121A for eventual execution and not enqueue administrative task 122 until administrative task 121A finishes.

An implementation of dependency 150 may entail administrative task state variables that track the progress of respective administrative tasks and that may be inspected by interdependent administrative tasks and/or CDBMS 100 such as for scheduling/sequencing. In an embodiment, sharing data that is produced and used by interdependent administrative tasks may be accelerated by fine-grained colocation by pinning interdependent administrative tasks to a same thread or CPU core, which may have load rebalancing implications as discussed later herein.

Step 205 detects a lack of dependency of a third administrative task on the second administrative task. For example, administrative tasks 122-123 are not interdependent, regardless of whether they operate on a same or separate respective databases. Based on detecting that lack of dependency, step 206 may concurrently execute administrative tasks 122-123 to administer a same or separate respective databases. For example, a same address space may be shared by two threads that have two respective backlog queues. Step 206 may enqueue administrative tasks 122-123 respectively on the two queues, and eventually step 206 may dequeue administrative tasks 122-123 at a same or different times such that execution of administrative tasks 122-123 at least partially temporally overlaps, which is concurrent execution. Dynamics and mechanisms for intelligent scheduling such as load rebalancing are discussed later herein.

The two administrative tasks that step 206 concurrently executes may be two identical instances of a same repeated administrative task or may be two administrative tasks executing respective distinct logic. In another scenario, step 206 may concurrently execute two sets of administrative tasks instead of two individual administrative tasks. For example as discussed earlier herein for administrative tasks T1A-B and T2A-B, step 206 may concurrently execute two sequences of administrative tasks, where each sequence is independent of the other sequence, even though the administrative tasks within a sequence may be interdependent such as phased. For example, administrative tasks T1A and T2A may be one sequence that races ahead of a concurrent other sequence having administrative tasks T1B and T2B. In another example, the two sets of administrative tasks are not sequences and have no internal dependencies. In that case, step 206 may enqueue the two sets of administrative tasks on a same queue or two separate respective queues.

2.1 Backlog Queue

A cloud may host DBMS 100 that may contain at least 20,000 pending administrative tasks at a same time. Admission control is the purpose of a backlog queue of too many pending administrative tasks that all are ready to execute. Herein, a ready administrative task, a pending administrative task, and a queued administrative task are synonymous. Admission control smooths an administration demand spike by deferring some ready administrative tasks until later. Otherwise, interference such as context switch overhead as with an operating system native scheduler that concurrently executes too many administrative tasks may cause virtual memory swapping or thrashing of a hardware cache, a database data block cache, or a database input/output (I/O) buffer pool, all of which may add latency that decreases throughput.

A backlog queue prevents such interference by limiting a count of currently executing administrative tasks to match natural execution units such as threads, hyper-threads, or CPU cores. Thus, a thread or core may be more or less dedicated to a particular current administrative task, and the thread or core may have its own backlog queue of ready administrative tasks or may share a queue with other threads or administrative tasks. A shared queue may contain more administrative tasks because a shared queue feeds work to more execution units. An unshared queue should contain less administrative tasks so that the queue's sole execution unit does not become a system-wide bottleneck.

2.2 Rebalancing

Load imbalance occurs when cores or computers have dissimilar amounts of work, which may decrease throughput and, as a worst case, may cause some cores or computers to idle with empty queues even though other queues have a backlog of administrative tasks. Initial scheduling of new administrative tasks may improve load balancing by selecting shortest queue(s) that contain the fewest pending administrative tasks. However, fluctuating conditions, heterogenous hardware capacities, and/or racing may cause an initially balanced workload to become imbalanced.

In that case, rebalancing or work stealing may restore workload balance. For example, CDBMS 100 may move a subset of an overloaded first queue's administrative tasks to an underloaded second queue. Such scheduling decisions may be facilitated by inspecting the status of individual or sets of administrative tasks. For example, the lifecycle of an administrative task may operate as a finite state machine that has mutually exclusive states such as queued (i.e. ready), running, and waiting on I/O.

2.3 Execution State

A thread is blocked (i.e. stalled) if it is running an administrative task that is waiting on I/O such as fetching a data block or flushing a buffer. Unlike a core that can context switch to another thread, an individual thread cannot pre-emptively switch to a different administrative task. Pending administrative tasks in the queue of a blocked thread may starve, which means that the pending administrative tasks have no opportunity to execute, even if the thread's core idles. Especially problematic for system responsiveness is priority inversion, where a high priority administrative task starves due to a thread that is blocked on a low priority administrative task.

The state of an administrative task or set of administrative tasks may be tracked in a variable that other administrative tasks or CDBMS 100 may inspect. For example, the state variable of an administrative task may indicate that the administrative task is waiting for I/O and, in that case, CDBMS 100 may reactively move pending administrative task(s) from the queue of the waiting administrative task's thread to a queue of a different thread.

2.4 Resource-Based Scheduling

In another example, an administrative task or set of administrative tasks may be associated with metadata that specifies resource requirements that may be load balancing factors. For example, the respective metadata of two administrative tasks may indicate that both administrative tasks are I/O intensive or both administrative tasks are CPU intensive, in which case load balancing is improved if both administrative tasks are not added to a same queue. For example, each queue or thread may have associated used and unused amounts of a resource. For example, a queue's demand for a resource may be the sum of demands for that resource by all administrative tasks in that queue, including the currently dequeued and running administrative task.

A resource demand is a reserved amount, a sum of which may be oversubscribed, or a used amount with a sum that cannot exceed capacity. Computer resources include processors (e.g. measured in time, cycles, cores, or hyperthreads), volatile memory, network bandwidth, persistent storage, or positions or latency in the queue itself. For example, a queue may contain the least administrative tasks, have the least latency for an administrative task to reach the head of the queue, and/or have a fixed backlog limit of ten pending administrative tasks.

A used or unused amount of a resource may be a balancing factor such as to select a queue that: a) currently demands a least amount of a resource, b) has a most unused amount of a resource, or c) has a least ratio of demand to unused or demand to total capacity (used and unused). Selecting a queue or thread may facilitate assignment of a new administrative task to a queue or relocation of an administrative task from an overloaded queue to an underloaded queue. CDBMS 100 may monitor fluctuating resource availability of queues, databases, and/or computers and may monitor fluctuating resource usage by administrative tasks and subsets of (e.g. identical or interdependent) administrative tasks. Resource history may be a balancing factor such as with a timeseries, a window sliding over a timeseries, or a moving average of a window.

3.0 Example Source Annotations

Figure 3:
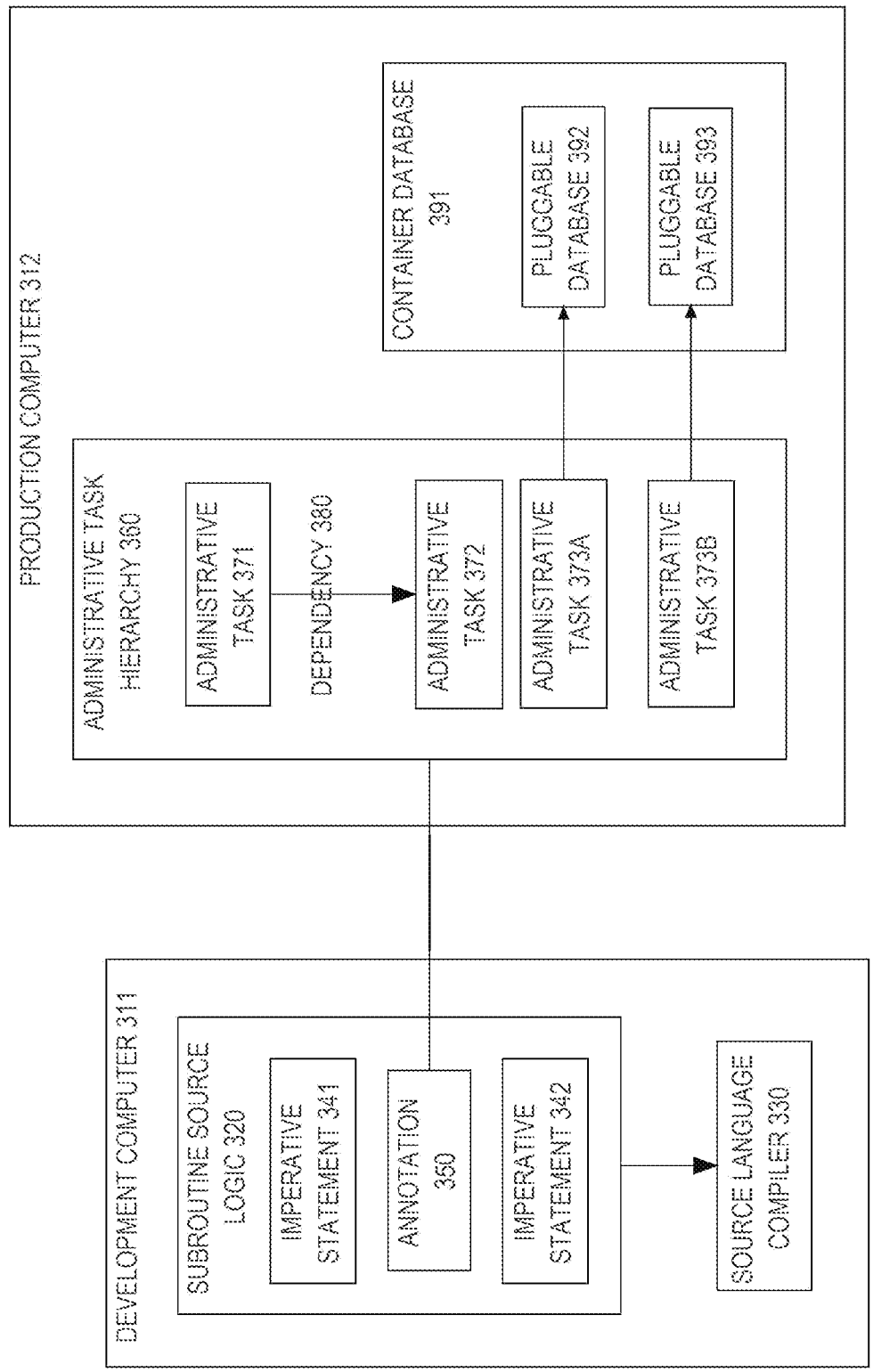
FIG. 3 is a block diagram that depicts an example annotation that may declaratively specify an administrative task or administrative task hierarchy and a dependency between administrative tasks or phases.

FIG. 3 is a block diagram that depicts example annotation 350 that may declaratively specify administrative task 371 or administrative task hierarchy 360 that contains administrative tasks 371-373 and dependency 380 that automatically administer one, some, or all of databases 391-393 in cloud 300 that contains computers 311-312.

Development computer 311 hosts and operates source language compiler 330 that may compile a source language to generate, based on annotation(s) 350, an executable codebase for administrative task hierarchy 360. Source language compiler 330 may generate an application program that may instantiate administrative task hierarchy 360. When deployed and executed on production computer 312, the application program automatically administers databases 391-393, including instantiating and executing administrative task hierarchy 360.

The application program may contain logic, such as imperative statements 341-342, that are not part of administrative task hierarchy 360 but may still administer databases 391-393 or perform other work. For example, the application may contain cooperating scripts and/or subroutines such as defined by subroutine source logic 320 that may be defined in a (e.g. general purpose) source language such as C, Java, or Python.

Annotation 350 may be embedded inline between imperative statements 341-342 or may instead be metadata that: a) decorates a source codebase artifact such as a subroutine or class or b) resides in an external descriptor such as an extensible markup language (XML) or JavaScript object notation (JSON) document or a property file. Placement of annotation 350 between imperative statements 341-342 may indicate that administrative task hierarchy 360 begins execution or fully executes between respective executions of imperative statements 341-342. For example, imperative statement 342 may or may not wait for administrative task hierarchy 360 to finish executing.

In an embodiment, annotation 350 is an occurrence of a source preprocessor macro such as for the C or C++ programing language. For example, annotation 350 may invoke the following space_mon_act macro that declares administrative tasks 373A-373B that periodically monitor how much persistent space do pluggable databases 392-393 respectively have.

```
/* Background scheduler _meout action under above action group*/
#define space_mon_act KSBSGACTDN(space_mon_act_)
KSBSGACTDV(space_mon_act_,
"Space Monitor action",
FADDR(space_monitor_cbk), /* Callback function */
"SPACE_MONITOR_ACTGRP",
0, /* Hierarchical action */
KSBSGTOUT | KSBSG_PDB_SWITCH, /* Iterate over each PDB */
3000) /* Every 3 seconds */
```

The following terms in the above space_mon_act macro have the following meaning.

space_monitor_cbk is a pointer to a custom callback function that actually measures free space.

3000 is the frequency at which the callback is repeatedly invoked.

KSBSG_PDB_SWITCH indicates a separate identical concurrent administrative task for each pluggable database.

SPACE_MONITOR_ACTGRP indicates that administrative task hierarchy 360 contains administrative tasks 373A-373B.

As specified above, administrative tasks 373A-373B are executed every three seconds, which may be implemented in various ways. In an embodiment, administrative tasks 373A-373B do not use a queue. In an embodiment, administrative tasks 373A-373B have respective instances of a state machine whose three states are queued, running callback space_monitor_cbk, and sleeping for three seconds. The three states occur in sequence in an endless loop such that sleeping is followed by the queued state.

In an embodiment, a priority queue of pending administrative tasks may be sorted by frequency, such that an administrative task having a lesser period has a higher priority in the queue. An administrative task that has no period (i.e. does not repeat) may have a lowest priority or a highest priority in the queue.

In a related example, subroutine source logic 320 is the definition of space_monitor_cbk, and annotation 350 declares a different administrative task that reclaims/compacts space. For example, imperative statement 341 in space_monitor_cbk may conditionally return if there is ample free space. In that case, there is no need to reclaim space, and annotation 350 and imperative statement 342 do not execute, in which case a compaction administrative task is not instantiated. That is one administrative task may spawn another administrative task in a same or different administrative task hierarchy. For example, annotation 350 may invoke the following space_maintenance_act macro.

```
#define space_maintenance_act
KSBSGACTDN(space_maintenance_act_)
KSBSGACTDV(space_maintenance_act_,
"Space Maintenance action",
FADDR(space_maintenance_cbk), /* Callback function */
space_mon_act, /* Hierarchical action */
"SPACE_MONITOR_ACTGRP",
KSBSGHACT | KSBSG_PDB_SWITCH,/* Iterate over each PDB */
0) /* Will be triggered */
```

The following term in the above space_maintenance_act macro has the following meaning.

space_maintenance_cbk is a pointer to a custom callback function that actually reclaims space.

3.1 Example Hierarchy Annotations

An annotation may declare one or more administrative tasks in one or more administrative task hierarchies. An administrative task hierarchy may contain administrative tasks defined by one or more annotations. As explained earlier herein, administrative tasks may be grouped into phases such as separated by dependencies. For example according to dependency 380, administrative task 371 may execute in previous phase 1 and administrative task 372 may execute in next phase 2. For example, phases 1-2 are specified as arguments in the following test_act_a and test_act_b macros.

```
#define test_act_a KSBSGACTDN(test_act_a_)
KSBSGACTDV(test_act_a_, "action a",
test_act_a_cbk, "TESTGRP1",
0,
1, /* phase 1 */
KSBSGTOUT, 0)
#define test_act_b KSBSGACTDN(test_act_b_)
KSBSGACTDV(test_act_b_, "action b",
test_act_b_cbk, "TESTGRP1",
0,
2, /*phase 2*/
KSBSGTOUT|KSBSGPDB, 0)
```

The following term in the above space_maintenance_act macro have the following meaning.

TESTGRP1 indicates an administrative task hierarchy

An initially empty administrative task hierarchy may have its own annotation. For example, administrative task hierarchy TESTGRP1 is specified in the following test_act_grp1 macro.

```
#define test_act_grp1 KSBSGACTGRPDN(test_act_grp1_)
KSBSGACTGRPDV(test_act_grp1_, "test action group - 1",
"TESTGRP1",
KSBSG_PERSONALITY_SYS,
KSBDNPDF, FADDR(NULL), FADDR(NULL),
FADDR(NULL))
```

3.2 Example Instrumentation

Multiple administrative tasks in an administrative task hierarchy may read and write a shared variable such as when the multiple administrative tasks and the variable share an address space. A variable may be a pointer to a compound (e.g. with nesting) data structure. For example, test_act_grp1_var1 is a variable for the test_act_grp1 administrative task hierarchy as specified in the following variable macro.

```
#define test_act_grp1_var1 KSBSGACTGRPVARDN(ub4
*, test_act_grp1_var1_)
KSBSGACTGRPVARDV(test_act_grp1, ub4 *, test_act_grp1_var1_)
```

Macros may be defined in a same or different (e.g. separate header file) source file as subroutine source logic 320. Subroutine source logic 320 may contain multiple annotations that respectively invoke some of the various macros above that have different respective callback functions with different respective algorithmic logic for different respective administrative tasks. Source language compiler 330 detects and processes each annotation. Multiple annotations may be respective invocations of a same or different macros.

Computers 311-312 are shown collocated in cloud 300 but may instead reside in different environments that are more or less disconnected and/or owned by separate parties that are more or less unrelated. For example, source language compiler 330 may compile annotation 350 before identification and creation of any or all of production computer 312 and its shown internal components.

For example, annotation compilation may occur before relational schemas are developed for databases 391-393. Likewise, annotation compilation may occur before it is known how many pluggable databases does container database 391 contain and thus before it is known how many identical instances of administrative tasks 373A-373B will be instantiated. Thus, annotation 350 in its compiled form in its compiled codebase may be copied and deployed into many environments and/or bundled in a shrink wrapped software release.

4.0 Database System Overview

A database management system (DBMS) manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

5.0 Pluggable Database and Container Database System Overview

Database consolidation involves distributing and sharing computing resources among multiple databases. Databases may be consolidated using a container database management system. A consolidated database, such as a multitenant container database (CDB), includes one or more pluggable databases (PDBs).

A container database includes a data dictionary, which comprises metadata that defines database objects in the container database. For example, the data dictionary for a given CDB will include metadata describing each PDB that is contained in the given CDB, including the database objects included in each PDB. Further, each pluggable database includes a PDB-specific database dictionary that comprises metadata that defines database objects contained in the pluggable database. Database objects include tables, table columns, indexes, files, tablespaces, data types, users, user privileges, and storage structures used for storing database object data, etc.

A container database may manage multiple pluggable databases and a given database server instance may manage and serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

An application may access a pluggable database by establishing a database session on the container database management system for that pluggable database, where a database session represents the connection between an application and the container database management system for accessing the pluggable database. A database session is initiated for a pluggable database by, for example, transmitting a request for a new connection to the container database management system, the request specifying the pluggable database. In response to such a request, the container database management system establishes the requested database session. A container database management system may host multiple database sessions, each database session being for one of multiple pluggable databases.

A given container database is configured based on the requirements of those database management system (DBMS) features that are applicable to the container database. A DBMS feature that is applicable to a container database is one that interacts with or influences the container database and, as such, requires a certain configuration of the container database. DBMS features that may be applicable to a given container database, comprise one or more of: a version of the DBMS that manages the container database (including major version, minor version, and/or patch level); optional features that may be installed or implemented for a container database (such as data encryption, a feature that allows multiple levels of data restriction within areas of the database, localization enablement); common users that exist in the container database; independently-installed patches that have been installed for the DBMS that manages the container database; etc.

The configuration of a CDB encompasses aspects of the CDB that are adjusted based on the DBMS features that are applicable to the CDB. Such aspects of the CDB comprise one or more of: data stored within or the structure of the database objects stored in the pluggable databases of the CDB; the layout or content of the underlying operating system files of the CDB; the number of background processes required by the CDB; identifiers associated with the CDB; variables required for CDB functionality; initialization parameters; a character set with which data in the CDB is encoded; time zones supported by the CDB; standard database block size; tablespace settings; undo settings; services supported by the CDB; special features implemented for the CDB; database server instance cluster support for the CDB; etc.

Pluggable databases may be "plugged in" to a container database, and may be transported between database servers and/or database management systems. A database server instance plugs a pluggable database into a container database by including metadata describing the pluggable database in the database dictionary of the container database and by initiating management of the pluggable database as part of the container database. Any number of the aspects of the configuration of a container database, into which a particular pluggable database is plugged, affects the pluggable database.

When a pluggable database is moved to a destination container database from a source container database, where the destination and source container databases have the same configuration, the pluggable database need not be reconfigured prior to making the pluggable database available to operations at the destination container database. However, the source and destination container databases of a relocating pluggable database are not always configured for the same set of DBMS features. When a pluggable database is moved to a destination container database that has a different configuration than the source container database of the pluggable database, the relocated pluggable database is reconfigured to conform to the configuration of the destination container database, which allows the relocated pluggable database to be compatible with the DBMS features that are applicable to the destination container database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
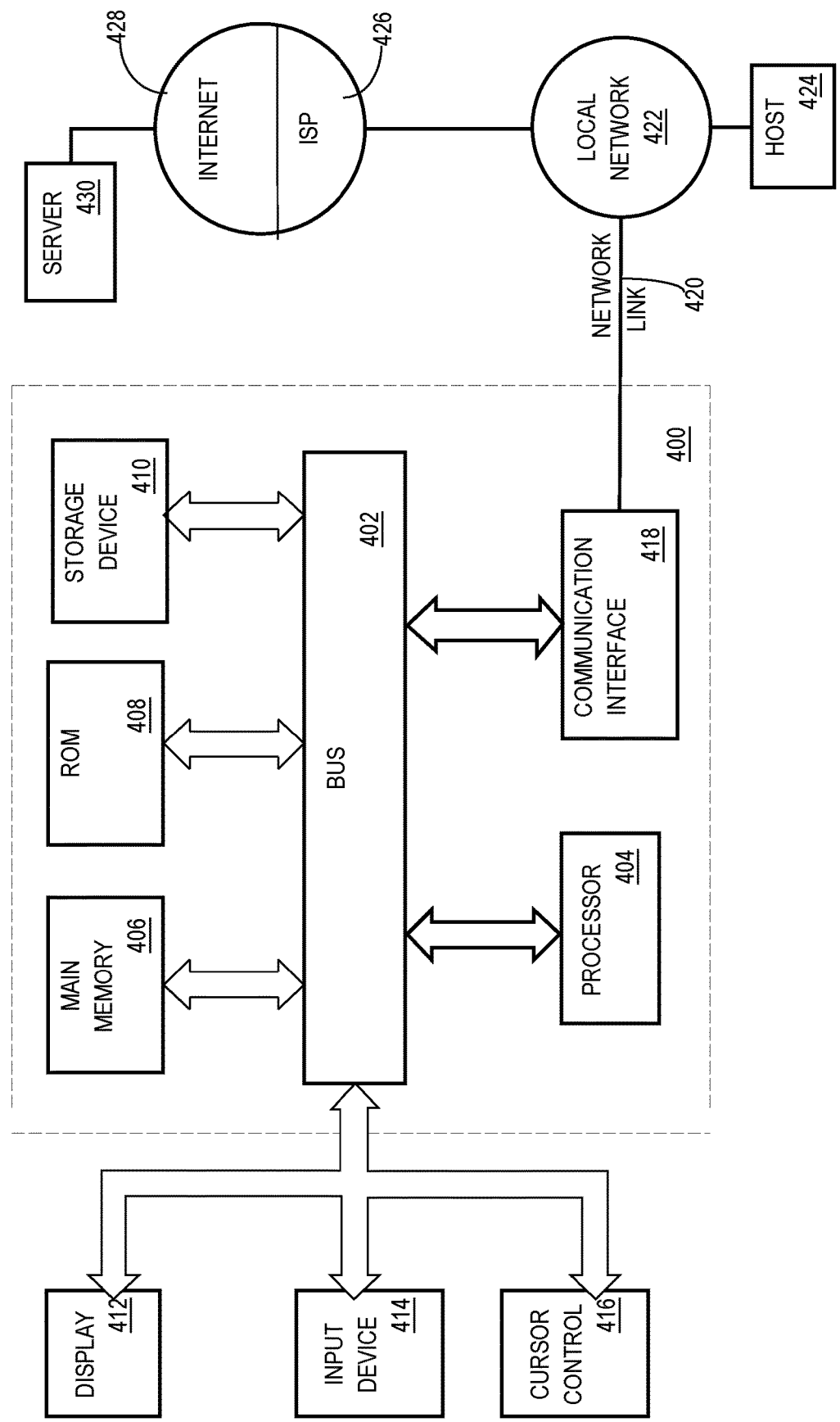
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 46, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 46. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 46. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 46 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 46, or other non-volatile storage for later execution.

Software Overview

Figure 5:
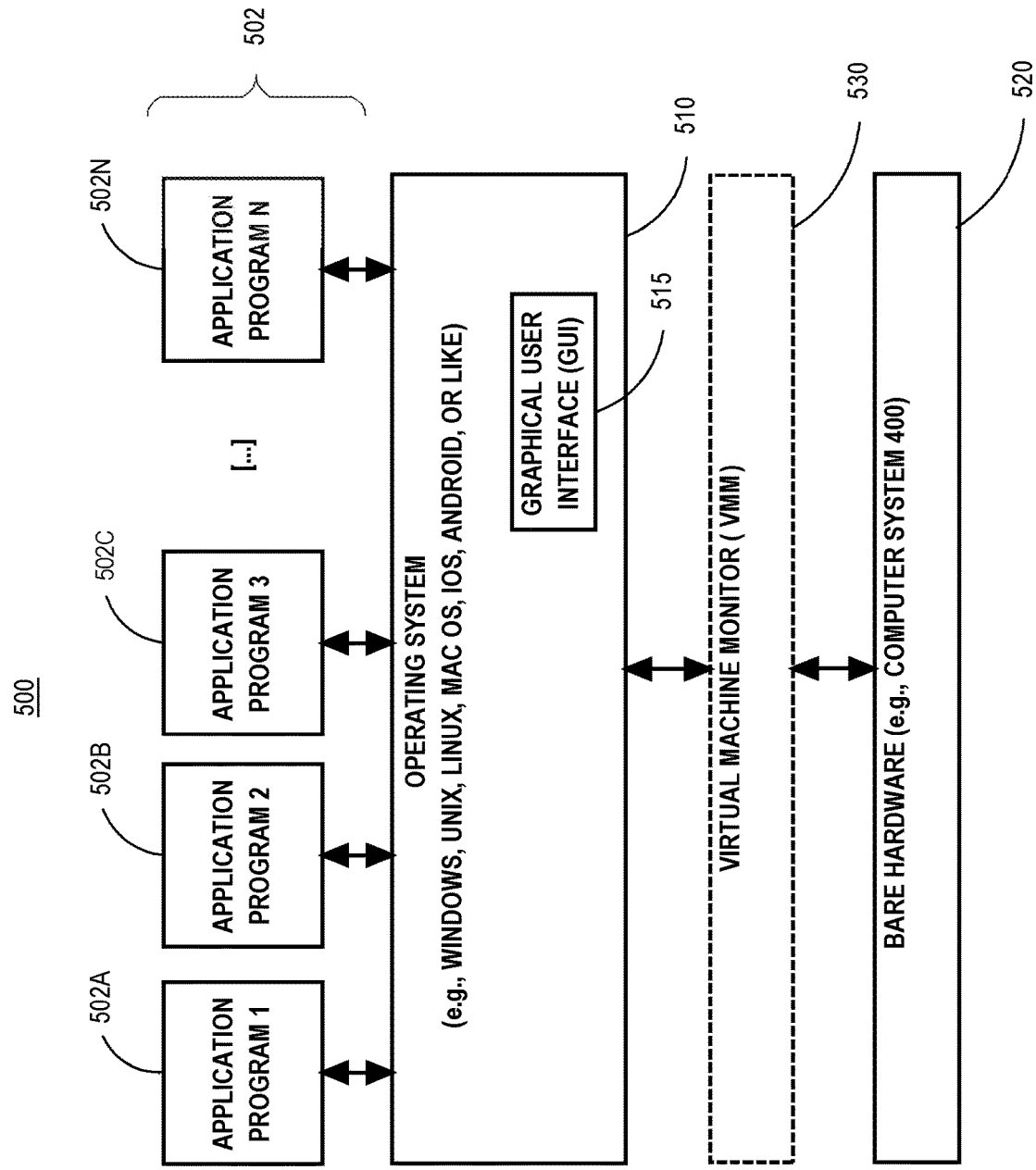
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 46, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 46 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    analyzing, by a container database management system (CDBMS), an administration request;
    identifying and generating, by the CDBMS and based on said analyzing the administration request, a plurality of administrative tasks that administer one or more pluggable databases in a container database, wherein the plurality of administrative tasks comprises a first subset plurality of administrative tasks and a second subset plurality of administrative tasks;
    identifying a dependency of a first administrative task of the first subset plurality of administrative tasks on a second administrative task of the first subset plurality of administrative tasks;
    detecting a lack of dependency of the second subset plurality of administrative tasks on the first subset plurality of administrative tasks;
    enqueuing as ready to execute, based on said detecting said lack of dependency, the second administrative task on a first queue of a first thread or core and the second subset plurality of the administrative tasks on a second queue of a second thread or core;
    deferring, based on said identifying said dependency, enqueuing the first administrative task until after completion of the second administrative task; and
    executing, by said first thread or core, the second administrative task concurrent to executing, by said second thread or core, the second subset plurality of the administrative tasks.

2. The method of claim 1 wherein said identifying and generating the plurality of administrative tasks that administer the one or more pluggable databases comprises an administrative task of the plurality of administrative tasks identifying and generating another administrative task of the plurality of administrative tasks.

3. The method of claim 2 wherein said identifying and generating the other administrative task of the plurality of administrative tasks is conditional.

4. The method of claim 1 wherein:
    the first subset plurality of administrative tasks comprises:
        a third subset of administrative tasks that includes the second administrative task, and
        a fourth subset of administrative tasks;
    the first administrative task should not execute until the third subset of administrative tasks has executed;
    said identifying and generating the plurality of administrative tasks comprises the first administrative task conditionally identifying and generating the fourth subset of administrative tasks.

5. The method of claim 1 further comprising:
    identifying and generating, by the CDBMS and based on said analyzing the administration request, a second plurality of administrative tasks that administer the one or more pluggable databases in a second container database that contains same said one or more pluggable databases;

said plurality of administrative tasks and the second plurality of administrative tasks containing different respective counts of administrative tasks.

6. The method of claim 1 further comprising the CDBMS autonomously generating the administration request.

7. The method of claim 1 further comprising the CDBMS containing an internal scheduler that schedules execution of the plurality of administrative tasks, wherein the internal scheduler is not an operating system scheduler.

8. The method of claim 1 further comprising the CDBMS moving one or more administrative tasks from the first queue of the first thread or core to the second queue of the second thread or core.

9. The method of claim 8 further comprising the CDBMS detecting that the first thread is blocked on input/output (I/O), wherein said moving the one or more administrative tasks is in response to said detecting that the first thread is blocked.

10. The method of claim 8 further comprising the CDBMS detecting an amount of demand or availability of a resource, wherein said moving the one or more administrative tasks is in response to said detecting said amount of demand or availability of the resource.

11. The method of claim 10 wherein said amount of demand or availability of the resource is an amount of demand or availability of the resource for a subset of the plurality of administrative tasks.

12. The method of claim 1 further comprising:
first executing the first administrative task to administer a first pluggable database, and second executing the first administrative task to administer a second pluggable database;
first executing the second administrative task to administer the first pluggable database, and second executing the second administrative task to administer the second pluggable database;
wherein said deferring said enqueuing of the first administrative task until after completion of the second administrative task comprises:
deferring said first executing the first administrative task until after completion of the first executing the second administrative task to administer the first pluggable database, and
deferring said second executing the first administrative task until after completion of the second executing the second administrative task to administer the second pluggable database.

13. The method of claim 12 wherein said first executing the first administrative task to administer the first pluggable database begins before said second executing the second administrative task to administer the second pluggable database finishes.

14. The method of claim 1 performed by the CDBMS in a single address space.

15. The method of claim 1 further comprising the CDBMS containing at least 20,000 administrative tasks for a plurality of administration requests.

16. A method comprising:
detecting, during a compilation, a first annotation that declares a first plurality of administrative tasks that administer one or more pluggable databases in a container database, wherein:
the first annotation contains an identifier of a first execution phase, and
said compilation determines neither a count of the one or more pluggable databases nor a count of the first plurality of administrative tasks;
detecting, during the compilation, a second annotation that declares a second plurality of administrative tasks that administer the one or more pluggable databases in the container database, wherein the second annotation contains an identifier of a second execution phase;
identifying, during the compilation and based on the identifier of the first execution phase and the identifier of the second execution phase, a dependency of the second plurality of administrative tasks on the first plurality of administrative tasks;
concurrently executing the first plurality of administrative tasks; and
deferring, based on said identifying said dependency, execution of the second plurality of administrative tasks until after completion of the first plurality of administrative tasks;
wherein the method is performed by one or more computers.

17. The method of claim 16 further comprising identifying two algorithmically distinct administrative tasks defined in a same subroutine.

18. The method of claim 16 further comprising said first annotation occurring between two imperative statements in source logic of a subroutine.

19. The method of claim 16 further comprising creating said container database after said compilation.

20. One or more non-transitory computer-readable media storing instructions that, when executed by one or more processors, cause:
detecting, during a compilation, a first annotation that declares a first plurality of administrative tasks that administer one or more pluggable databases in a container database, wherein:
the first annotation contains an identifier of a first execution phase, and
said compilation determines neither a count of the one or more pluggable databases nor a count of the first plurality of administrative tasks;
detecting, during the compilation, a second annotation that declares a second plurality of administrative tasks that administer the one or more pluggable databases in the container database, wherein the second annotation contains an identifier of a second execution phase;
identifying, during the compilation and based on the identifier of the first execution phase and the identifier of the second execution phase, a dependency of the second plurality of administrative tasks on the first plurality of administrative tasks;
concurrently executing the first plurality of administrative tasks; and
deferring, based on said identifying said dependency, execution of the second plurality of administrative tasks until after completion of the first plurality of administrative tasks.

21. The one or more non-transitory computer-readable media of claim 20 wherein the instructions further cause creating said container database after said compilation.

22. One or more non-transitory computer-readable media storing instructions that, when executed by one or more processors, cause:
analyzing, by a container database management system (CDBMS), an administration request;
identifying and generating, by the CDBMS and based on said analyzing the administration request, a plurality of administrative tasks that administer one or more pluggable databases in a container database, wherein the plurality of administrative tasks comprises a first subset plurality of administrative tasks and a second subset plurality of administrative tasks;

identifying a dependency of a first administrative task of the first subset plurality of administrative tasks on a second administrative task of the first subset plurality of administrative tasks;

detecting a lack of dependency of the second subset plurality of administrative tasks on the first subset plurality of administrative tasks;

enqueuing as ready to execute, based on said detecting said lack of dependency, the second administrative task on a first queue of a first thread or core and the second subset plurality of the administrative tasks on a second queue of a second thread or core;

deferring, based on said identifying said dependency, enqueuing the first administrative task until after completion of the second administrative task; and executing, by said first thread or core, the second administrative task concurrent to executing, by said second thread or core, the second subset plurality of the administrative tasks.

23. The one or more non-transitory computer-readable media of claim 22 wherein:
   said identifying and generating the plurality of administrative tasks that administer the one or more pluggable databases comprises an administrative task of the plurality of administrative tasks identifying and generating another administrative task of the plurality of administrative tasks;
   said identifying and generating the other administrative task of the plurality of administrative tasks is conditional.

24. The one or more non-transitory computer-readable media of claim 22 wherein the instructions further cause:
   the CDBMS detecting that the first thread is blocked on input/output (I/O);
   the CDBMS moving, in response to said detecting that the first thread is blocked, one or more administrative tasks from the first queue of the first thread or core to the second queue of the second thread or core.

25. The one or more non-transitory computer-readable media of claim 22 wherein:
   the CDBMS contains the one or more processors;
   the instructions are configured to execute in a single address space.

\* \* \* \* \*